United States Patent Office 3,527,599
Patented Sept. 8, 1970

3,527,599
PROCESS FOR THE PRODUCTION OF IVa AND Va METALS OF THE PERIODIC SYSTEM AND THEIR ALLOYS
Gerhard Jangg, Getreistemarke 9, Vienna, Austria
No Drawing. Filed Feb. 7, 1967, Ser. No. 614,415
Int. Cl. C22b 51/00, 53/00
U.S. Cl. 75—84.5                                    8 Claims

ABSTRACT OF THE DISCLOSURE

Process for producing metals of Group IVa or Va of the Periodic System or alloys of said metals by amalgam reduction. A metal halide, such as a metal chloride, is reduced by amalgam and the reduction mixture, prior to separation of amalgam, is admixed with an acidic aqueous solution which contains a substance capable of forming a water soluble compound with the Group IVa or Va metal ion. The acid solution may consist of hydrochloric or sulphuric acid and a complex former such as oxalic acid, tartaric acid, citric acid, salicylic acid, or sulphosalicylic acid. Dilute hydrofluoric acid is also suitable.

SUMMARY OF INVENTION

The metals of Group IVa and Va of the Periodic System viz titanium, zirconium, hafnium, and vanadium, niobium and tantalum have acquired a growing importance in modern technology. At present they are obtained by various processes. Titanium, zirconium and hafnium are mainly produced by the Kroll and Hunter processes, while vanadium, niobium and tantalum are also obtained by heating with carbon or aluminium, or by the thermic breakdown of their halides. All these processes have their drawbacks in that the metals are obtained with a low grade of purity or they are only suitable for the production of small quantities of metals. Furthermore the said processes are also non-continuous and rather expensive.

According to various prior proposals which until now have only concerned uranium, thorium, titanium, zirconium and hafnium (whose general principle should allow the production also of Group Va metals), better results can be obtained by reducing the metallic halogens not with the simple elements calcium, magnesium or sodium as in the case of the Kroll and Hunter processes, but with amalgams.

By using amalgams, reduction can be effected at a low temperature, and the process is more readily controlled and may be carried out in continuous manner. Technical application has not until now been possible, however, because the further processing of the products of reaction has been proved unsatisfactory. These products consisted of an amalgam of the metals formed during reduction and contained a disproportionate quantity of the reducing metals (calcium, magnesium and sodium) together with the halide of the metal concerned as produced by the reduction and also the original halides which had not reacted in the reduction. Early proposals were to reduce chlorides with sodium amalgam and subsequent dry processing of the reactor product in which firstly, at normal temperature, a greater part of the mercury is removed by pressure, while the remainder of the mercury is separated at a higher temperature by distilling under vacuum. By heating to above 800° C., the sodium chloride which has formed melts and is largely eliminated under pressure from the residue. Lastly, the metal, in the form of a spongy mass, is subjected to a high vacuum for elimination of any remaining metallic sodium as well as remaining sodium chloride. The required metal residue left is then fairly pure.

A further prior proposal eliminates difficulties arising from distillation at such a high temperature that the chloride formed melts and separates out from the amalgam. As metallic chlorides melt at a relatively high temperature, this must be done under pressure to prevent the mercury from evaporating. The proposal was to use reduction mixtures of calcium and sodium amalgam in such proportions as to generate during reaction a eutectic mixture of sodium and calcium chlorides, which has a relatively low melting point. But even by using such mixtures of amalgam, temperatures of over 400° C. and pressure apparatus are still needed for further processing. Another prior proposal to treat the reaction mixtures with dilute non-oxidizing acids is successful for the production of uranium and thorium. When placed in dilute acid the reaction mixtures separate into amalgam and clear solution which absorbs all the secondary products of the reaction. The amalgam is separated from the solution and the mercury is separated from the amalgams by distillation to obtain the required metals.

Whereas this represents an important step forward in the production of uranium and thorium, such a process is not satisfactory for processing reaction mixtures in the reduction of Group IVa and Va metals, because a greater quantity of sludge is formed consisting mainly of tiny droplets of mercury and also containing a part of the metal it is desired to produce. There is as yet no process available which permits the breaking down of this sludge. The process therefore cannot be used for the production of Group IVa and Va metals.

Unexpectedly it has been found that the formation of this sludge during the treatment of the reaction mixture of the reduction of the halides, preferably the chlorides of the Group IVa and Va metals with alkali metal and/or alkaline earth metal amalgams, can be substantially or completely eliminated by using aqueous solutions of substances capable of forming water soluble compounds with the ions of the Group IVa and Va metals being processed.

Therefore according to this invention the process for obtaining a metal of Group IVa or Va of the Periodic System or an alloy thereof, by reduction of a halide, preferably a chloride of said metal with at least one amalgam of an alkaline metal and/or alkaline earth metal, is characterised by treating the reaction mixture with one or more aqueous solutions which combine with the ions of the said Group IVa or Va metal to form a compound soluble in water, which treatment is effected prior to separation of the amalgam and removal of mercury from the amalgam by distillation in order to leave the required Group IVa or Va metal or an alloy thereof as a residue.

Such solutions should be dilute solutions of non-oxidizing acids, preferably sulphuric or hydrochloric acid, in dilutions with water of 1:1 to 1:4, i.e., by hydrochloric acid containing 20% to 7% by weight of HCl or sulphuric acid 1:4, i.e., containing 50% by weight of $H_2SO_4$ to which is added as a complex former, oxalic acid, tartaric acid, citric acid, salicylic acid or sulphosalicylic acid, but preferably oxalic acid. These complex-forming acids (of which only a few examples are given above from a wide variety suitable) are added with advantage in such proportion that the resulting solutions are partly or semi-saturated or completely saturated. Good separation without formation of sludge can be obtained with aqueous solutions of hydrofluoric acid, preferably in a dilution of 10–40% acid by weight. This acid forms likewise stable and water soluble compounds with Group IVa and Va metals.

The presence of these complex forming substances avoids or minimizes the formation of sludge, as they prevent hydrolysis of those metallic chlorides which have not reacted. If such hydrolysis is allowed to occur, the products thereof collect around the tiny droplets of mercury present in the reaction mixture and prevent their agglomeration.

This behavior also explains the fact that, when using halides or chlorides of metals of the IVa and Va group that are readily hydrolysable even in strongly acid solutions, only complex forming substances will prevent the formation of sludge during the processing of the reaction mixtures. On the other hand uranium and thorium for instance, do not require the addition of complex forming substances since, with these metals, there is no hydrolysis in weakly acid solutions.

The process according to this invention represents a considerable step forward since it enables clean separation of the reaction mixtures in aqueous solutions to be effected even with metals of the IVa and Va groups, thus enabling these metals to be obtained by an amalgamo-metallurgical method. The metals are obtained from the amalgam, separated from the reaction mixtures, by the well known procedure of evaporating the mercury. Amalgamo-metallurgical processes are particularly advantageous in that high purity of the required metal is obtained with only a minute metalloid content.

By mixing amalgams of different metals and separating out the mercury by distillation, alloys of the required metal contained in the amalgam can be obtained without fusion. Also by ordinary reduction of the halides of different metals, separation of the amalgam mixture from the reaction product in accordance with this invention and by separation of the mercury by distillation, it is possible to arrive directly at the required alloy or alloys.

The following examples illustrate the process embodying the present invention:

EXAMPLE I 50 gr. titanium tetrachloride are made to react by stirring for 8 hours at 350° C. with 0.5% sodium amalgam in sufficient quantity for complete reduction. After cooling, the reaction product is immersed in cold hydrochloric acid (15% acid by weight) in which oxalic acid has been dissolved to saturation point and agitated until all by-products have been dissolved. The remaining amalgam is separated and dried and the mercury is eliminated by distillation in vacuum, a final temperature of 800° C. being reached during evaporation. 10.5 gr. of high purity titanium in the form of a spongy mass then remains as a residue free from mercury and highly sintered.

EXAMPLE II 50 gr. of niobium chloride are made to react with 1.5% sodium amalgam in excess by stirring for 8 hours at 350° C. The reaction product is treated after cooling with cold 20% by weight hydrofluoric acid. After the by-products have been completely dissolved the hydrofluoric acid is diluted with an equal volume of very hot water to dissolve the precipitated acid sodium fluoride and the amalgam is then extracted. The mercury is then distilled at a final temperature of 1200° C. and 8 gr. of spongy pure niobium are obtained free from mercury and highly sintered.

EXAMPLE III

A mixture of titanium tetrachloride and zirconium tetrachloride is caused to react with an excess of 0.5% sodium amalgam. The reaction mixture is then treated with 15% by weight hydrochloric acid adding oxalic acid to saturation point. The amalgam is extracted and the mercury removed by distillation at a final temperature of 800° C. A spongy form of titanium-zirconium alloy is obtained.

What I claim is:

1. In a process of producing a metal of Group IVa or Va of the Periodic System or an alloy of said metal by reduction of a corresponding metal halide with alkali metal amalgam or alkaline earth metal amalgam or admixtures thereof and subsequent separation of amalgam and recovery of metal or alloy from the amalgam, the improvement which comprises admixing the reaction mixture of halide and amalgam with an acidic aqueous solution containing a substance capable of forming a water soluble compound with Group IVa and Group Va metal ions before amalgam is separated from the reaction mixture.

2. The improvement of claim 1, wherein the metal halide is metal chloride.

3. The improvement of claim 1, wherein at least two metal halides are used, whereby an alloy is obtained.

4. The improvement of claim 1, wherein the aqueous solution is a dilute aqueous solution of a non-oxidizing acid, the acid content being about between 7% by weight and 50% by weight, said substance being a complex former.

5. A process according to claim 1 characterized by the fact that the aqueous solution essentially consists of dilute hydrofluoric acid.

6. A process as claimed in claim 5 wherein the dilute hydrofluoric acid solution contains about 10–40% by weight of hydrofluoric acid.

7. A process according to claim 4 characterized by the fact that the complex former is added to the solution in such quantities that the solution becomes at least partly saturated.

8. The improvement of claim 4, wherein said non-oxidizing acid is hydrochloric acid or sulphuric acid and said complex former is oxalic acid, tartaric acid, citric acid, salicylic acid, or sulphosalicylic acid.

References Cited

UNITED STATES PATENTS

| | | | |
|---|---|---|---|
| 2,813,787 | 11/1957 | Schmidt | 75—84.5 |
| 2,816,020 | 12/1957 | Quin | 75—84.5 |
| 2,864,690 | 12/1958 | Lee et al. | 75—84.4 |
| 2,956,872 | 10/1960 | Avery | 75—84.5 |
| 2,992,098 | 7/1961 | Boozenny et al. | 75—84.5 |
| 3,085,874 | 4/1963 | Kelley | 75—84.4 |
| 3,091,526 | 5/1963 | Fowler et al. | 75—84.5 |

L. DEWAYNE RUTLEDGE, Primary Examiner

G. K. WHITE, Assistant Examiner

U.S. Cl. X.R.

75—101